United States Patent
Konno et al.

(10) Patent No.: US 10,816,062 B2
(45) Date of Patent: Oct. 27, 2020

(54) TOOTHED BELT TRANSMISSION

(71) Applicant: TSUBAKIMOTO CHAIN CO., Osaka-shi, Osaka (JP)

(72) Inventors: Masahiko Konno, Osaka (JP); Shoichiro Shimizu, Osaka (JP); Masato Tomobuchi, Osaka (JP); Masaru Kanamori, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 363 days.

(21) Appl. No.: 15/893,910

(22) Filed: Feb. 12, 2018

(65) Prior Publication Data

US 2018/0245672 A1 Aug. 30, 2018

(30) Foreign Application Priority Data

Feb. 27, 2017 (JP) .................. 2017-034981

(51) Int. Cl.
*F16H 7/02* (2006.01)
*F16G 1/10* (2006.01)
*F16G 1/28* (2006.01)
*F16H 55/17* (2006.01)

(52) U.S. Cl.
CPC .............. *F16H 7/023* (2013.01); *F16G 1/10* (2013.01); *F16G 1/28* (2013.01); *F16H 55/171* (2013.01)

(58) Field of Classification Search
CPC .......... F16H 7/023; F16H 55/171; F16H 7/02; F16G 1/28; Y10T 74/19972
USPC ................................. 474/205, 153
See application file for complete search history.

(56) References Cited

U.S. PATENT DOCUMENTS

| | | | | |
|---|---|---|---|---|
| 3,260,125 A | * | 7/1966 | Dolza | F16H 55/14 474/148 |
| 3,313,166 A | * | 4/1967 | Elster | F16G 1/28 474/148 |
| 3,404,576 A | * | 10/1968 | Cicognani | F16H 55/171 474/148 |
| 3,756,091 A | * | 9/1973 | Miller | B62D 55/12 474/153 |
| 3,968,701 A | * | 7/1976 | Maruyama | F16G 1/28 474/153 |
| 3,996,812 A | * | 12/1976 | Cappotto | F16G 1/28 474/153 |
| 4,041,789 A | * | 8/1977 | Hoback | F16G 1/28 474/148 |

(Continued)

FOREIGN PATENT DOCUMENTS

| JP | 2010-96257 A | 4/2010 |
|---|---|---|
| JP | 2010-101395 A | 5/2010 |

*Primary Examiner* — Henry Y Liu
(74) *Attorney, Agent, or Firm* — Westerman, Hattori, Daniels & Adrian, LLP (57) ABSTRACT

The present invention provides a toothed belt transmission that reduces noise and vibration resulting from the engagement between a toothed belt and a toothed pulley, and that improves the durability of the toothed belt. The toothed belt transmission in which a tooth height of a toothed belt and a tooth height of a toothed pulley are set so that when the toothed belt and the toothed pulley start engaging with each other, tooth tip parts of the toothed belt and tooth bottom parts of the toothed pulley contact each other before tooth bottom parts of the toothed belt and tooth tip parts of the toothed pulley contact each other.

4 Claims, 8 Drawing Sheets

(56) References Cited

U.S. PATENT DOCUMENTS

| | | | | |
|---|---|---|---|---|
| 4,337,056 A * | 6/1982 | Bruns | F16G 1/28 | 474/153 |
| 4,403,979 A * | 9/1983 | Wujick | F16H 55/171 | 474/153 |
| 4,427,403 A * | 1/1984 | Kanamori | F16G 1/28 | 474/153 |
| 4,468,211 A * | 8/1984 | Hoshiro | F16H 7/023 | 474/153 |
| 4,515,577 A * | 5/1985 | Cathey | F16H 7/023 | 474/204 |
| 4,553,952 A * | 11/1985 | Tangorra | F16H 7/023 | 474/153 |
| 4,586,915 A * | 5/1986 | Cathey | F16G 1/28 | 474/205 |
| 4,614,509 A * | 9/1986 | Tangorra | F16H 7/023 | 474/205 |
| 4,650,443 A * | 3/1987 | Wetzel | F16G 1/28 | 474/153 |
| 4,679,999 A * | 7/1987 | Wetzel | F16G 1/28 | 474/153 |
| 4,722,721 A * | 2/1988 | Wetzel | F16G 1/28 | 474/153 |
| 4,840,606 A * | 6/1989 | Wetzel | F16G 1/28 | 474/153 |
| 4,840,608 A * | 6/1989 | Araki | F16G 1/28 | 474/153 |
| 4,878,886 A * | 11/1989 | Kitabayashi | F16G 1/28 | 474/204 |
| 5,015,218 A * | 5/1991 | Macchiarulo | F16G 1/28 | 474/152 |
| 5,662,541 A * | 9/1997 | Roovers | F16G 1/28 | 474/149 |
| 6,485,384 B1 * | 11/2002 | Ochiai | B41J 19/005 | 474/153 |
| 6,575,862 B2 * | 6/2003 | Miyaji | F16G 1/28 | 474/153 |
| 8,070,634 B2 * | 12/2011 | Gaynor | F16H 55/171 | 474/153 |
| 8,562,468 B2 * | 10/2013 | Tomobuchi | F16H 55/171 | 474/153 |
| 10,161,487 B2 * | 12/2018 | Pease | F16G 1/28 | |
| 2009/0156341 A1 * | 6/2009 | Gaynor | F16H 55/171 | 474/153 |
| 2009/0275433 A1 * | 11/2009 | Gaynor | F16H 55/171 | 474/153 |
| 2010/0105509 A1 * | 4/2010 | Tomobuchi | F16H 55/171 | 474/153 |

* cited by examiner

Related Art

TOOTHED BELT TRANSMISSION

BACKGROUND OF THE INVENTION

1. Field of the Invention

The present invention relates to a toothed belt transmission that transmits rotation, with a toothed belt having belt teeth and a toothed pulley having pulley teeth being engaged with each other.

2. Description of the Related Art

Conventionally, toothed belt transmissions each constituted of a toothed belt having belt teeth and a toothed pulley having pulley teeth have been widely used for the purpose of, for instance, transmitting rotation between a driving shaft and a driven shaft as in the transmission of rotation between a crank shaft and a cam shaft in automobile engines (see, for example, Japanese Patent Application Laid-open Nos. 2010-101395 and 2010-096257).

Since such toothed belt transmissions cause noise when driven, various attempts, such as forming belt teeth and pulley teeth in a helical tooth shape by being cut diagonally with respect to a rotational axis, have been made to reduce the noise.

SUMMARY OF THE INVENTION

However, in recent years, toothed belt transmissions have been, with the motorization of automobiles, introduced in devices (speed reduction mechanisms such as belt-driven electric power steering devices) or the like that provide assistance based on a force derived from electricity using a motor or the like. Therefore, since accessories are simple instead of a noise-proof cover such as a conventional timing belt for an engine, passengers are susceptible to noise. As a result, a demand level for noise reduction has been further boosted, and further attempts to reduce noise have been demanded.

Figure 8:
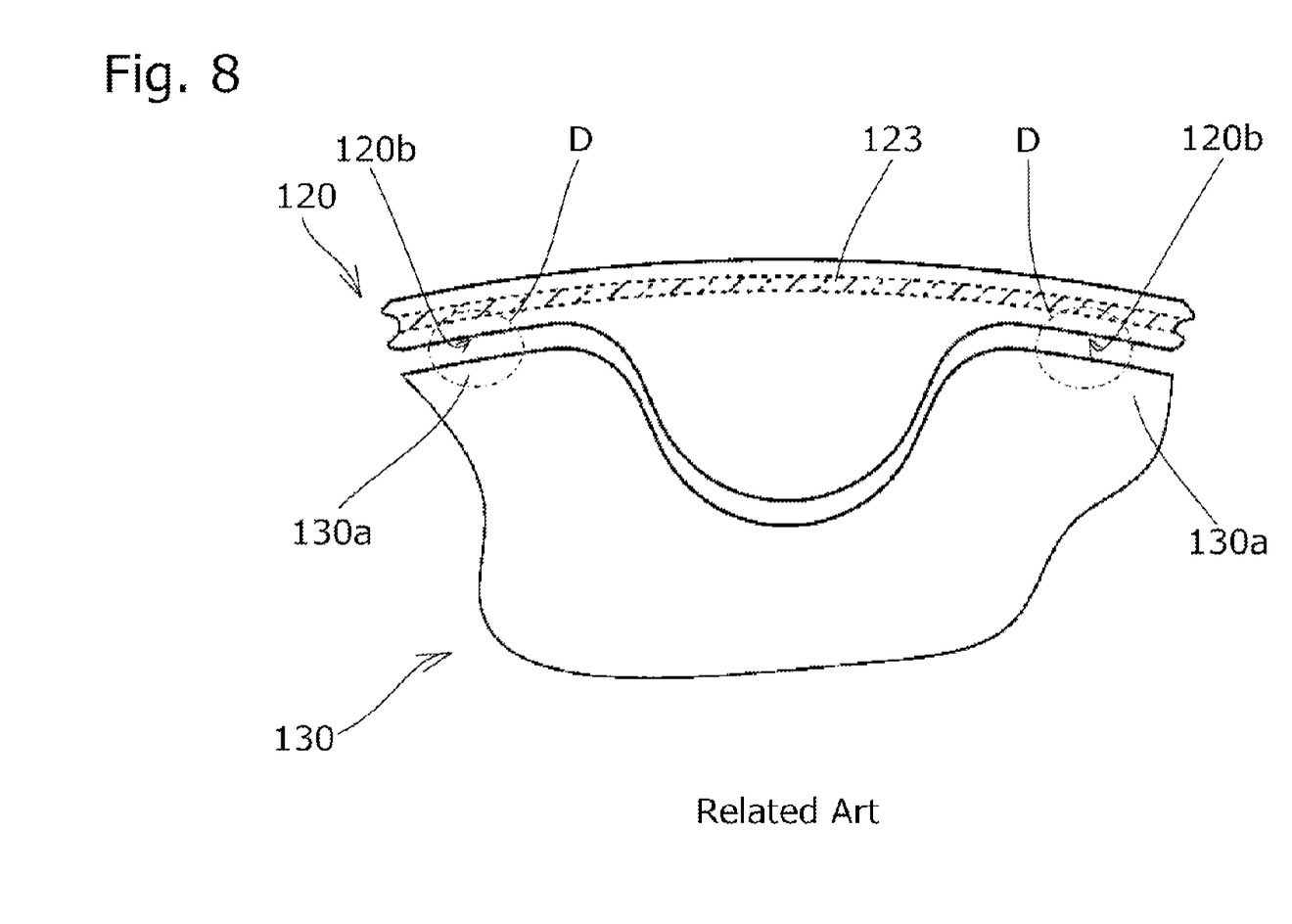
FIG. 8 is an explanatory view showing a toothed belt and a toothed pulley as a reference example.

After exhaustively considering a cause of the occurrence of noise, the present applicant has found that the collision between the tooth bottom parts of a toothed belt and the tooth tip parts of a toothed pulley results in the cause of the occurrence of the noise. That is, in a toothed belt 120 used to satisfy demand for transmitting high torque, a core wire 123 made of a hard material such as glass fibers and aramid fibers is buried near tooth bottom parts 120b as shown in FIG. 8, and the collision between the tooth bottom parts 120b of the toothed belt 120 in which the core wire 123 is buried and tooth tip parts 130a of a toothed pulley 130 made of metal as shown in D parts of FIG. 8 results in a cause of the occurrence of noise.

Therefore, the present invention has been made to solve the above problems and has an object of providing a toothed belt transmission that reduces noise and vibration resulting from the engagement between a toothed belt and a toothed pulley, and that improves the durability of the toothed belt.

In order to solve the above problems, an embodiment of the present invention provides a toothed belt transmission transmitting rotation, with a toothed belt having belt teeth and a toothed pulley having pulley teeth being engaged with each other, wherein a tooth height of the toothed belt and a tooth height of the toothed pulley are set so that, when the toothed belt and the toothed pulley start engaging with each other, tooth tip parts of the toothed belt and tooth bottom parts of the toothed pulley contact each other before tooth bottom parts of the toothed belt and tooth tip parts of the toothed pulley contact each other.

According to an embodiment of the present invention, a tooth height of a toothed belt and a tooth height of a toothed pulley are set so that when the toothed belt and the toothed pulley start engaging with each other, tooth tip parts of the toothed belt and tooth bottom parts of the toothed pulley contact each other before tooth bottom parts of the toothed belt and tooth tip parts of the toothed pulley contact each other.

Thus, after a shock caused when the toothed belt and the toothed pulley start engaging with each other is absorbed by the elastic deformation of the tooth tip parts of the toothed belt made of an elastic material such as rubber, it is possible to cause the tooth bottom parts of the toothed belt and the tooth tip parts of the toothed pulley to contact each other. Therefore, noise and vibration resulting from the contact between the tooth bottom parts of the toothed belt in which a core wire made of a hard material such as glass fibers and aramid fibers is buried and the tooth tip parts of the toothed pulley made of metal and the like may be reduced.

In addition, since it is possible to reduce the wear of the tooth bottom parts of the toothed belt resulting from the friction between the tooth bottom parts of the toothed belt in which the hard core wire is buried and the tooth tip parts of the toothed pulley made of the metal by causing the tooth bottom parts of the toothed belt and the tooth tip parts of the toothed pulley to contact each other after the shock caused when the toothed belt and the toothed pulley engage with each other is absorbed by the elastic deformation of the tooth tip parts of the toothed belt, the service life of the toothed belt may be prolonged. In addition, since it is possible to improve an anchor effect by which belt teeth are caught on pulley teeth by setting the height of the toothed belt to be longer, the occurrence of tooth skipping may be prevented. Thus, the wider usage of a toothed belt transmission can be accomplished, allowing the toothed belt to be driven at higher speed, for example.

According to another embodiment of the present invention, a curvature radius of the tooth root-side concave curved parts of the tooth surfaces of the belt teeth is set to be greater than or equal to a curvature radius of the tooth tip-side convex curved parts of the tooth surfaces of the pulley teeth. Thus, during the engagement between the toothed belt and the toothed pulley, it is possible to cause the tooth root-side concave curved parts of the belt teeth and the tooth tip-side convex curved parts of the toothed pulley to reliably contact each other. Therefore, the following effect may be produced besides causing the tooth root-side concave curved parts of the belt teeth and the tooth tip-side convex curved parts of the toothed pulley to smoothly contact each other to absorb the shock caused when the toothed belt and the toothed pulley start engaging with each other. That is, the tooth root-side concave curved parts of the belt teeth and the tooth tip-side convex curved parts of the toothed pulley are caused to contact each other in a state in which the toothed belt and the toothed pulley engage with each other, whereby the belt teeth are prevented from moving in a back and forth direction (belt longitudinal direction) with respect to the pulley teeth on the tooth root-side of the belt teeth. Therefore, even in a case in which the toothed belt transmission is applied to a device that requires reciprocating operation or an engine in which explosion fluctuation peculiar to an automobile occurs, noise and vibration caused when the belt teeth and the pulley teeth collide with each other in the back and forth direction may be reduced. In addition, since a shearing force applied to the tooth roots of the belt teeth is similarly reduced, the lack of the teeth or the like may be prevented. As a result, the service life of the toothed belt may be prolonged.

According to another embodiment of the present invention, a pressure angle of the tooth surfaces of the belt teeth is set to be greater than a pressure angle of the tooth surfaces of the pulley teeth. Therefore, when the toothed belt and the toothed pulley engage with each other, gaps are produced between the tooth surfaces of the belt teeth and the pulley teeth at the lateral parts of the belt teeth and the pulley teeth. Thus, compressed air between the tooth surfaces may be released in a tooth trace direction without being trapped to avoid a cause of engagement noise resulting from an explosive sound, while an engagement shock may be elastically relaxed by the gaps between the tooth surfaces. In addition, since it is possible to release the elastic material of the elastically-deforming belt teeth into the gaps between the tooth surfaces, colliding energy may be relaxed. Moreover, since the elastic material of the elastically-deforming belt teeth fill in the gaps between the tooth surfaces, an anchor effect by which the belt teeth are caught on the pulley teeth is improved. As a result, the occurrence of tooth skipping may be prevented.

DESCRIPTION OF THE PREFERRED EMBODIMENTS

Hereinafter, a description will be given, with reference to the drawings, of a toothed belt transmission 10 according to an embodiment of the present invention.

Figure 1:
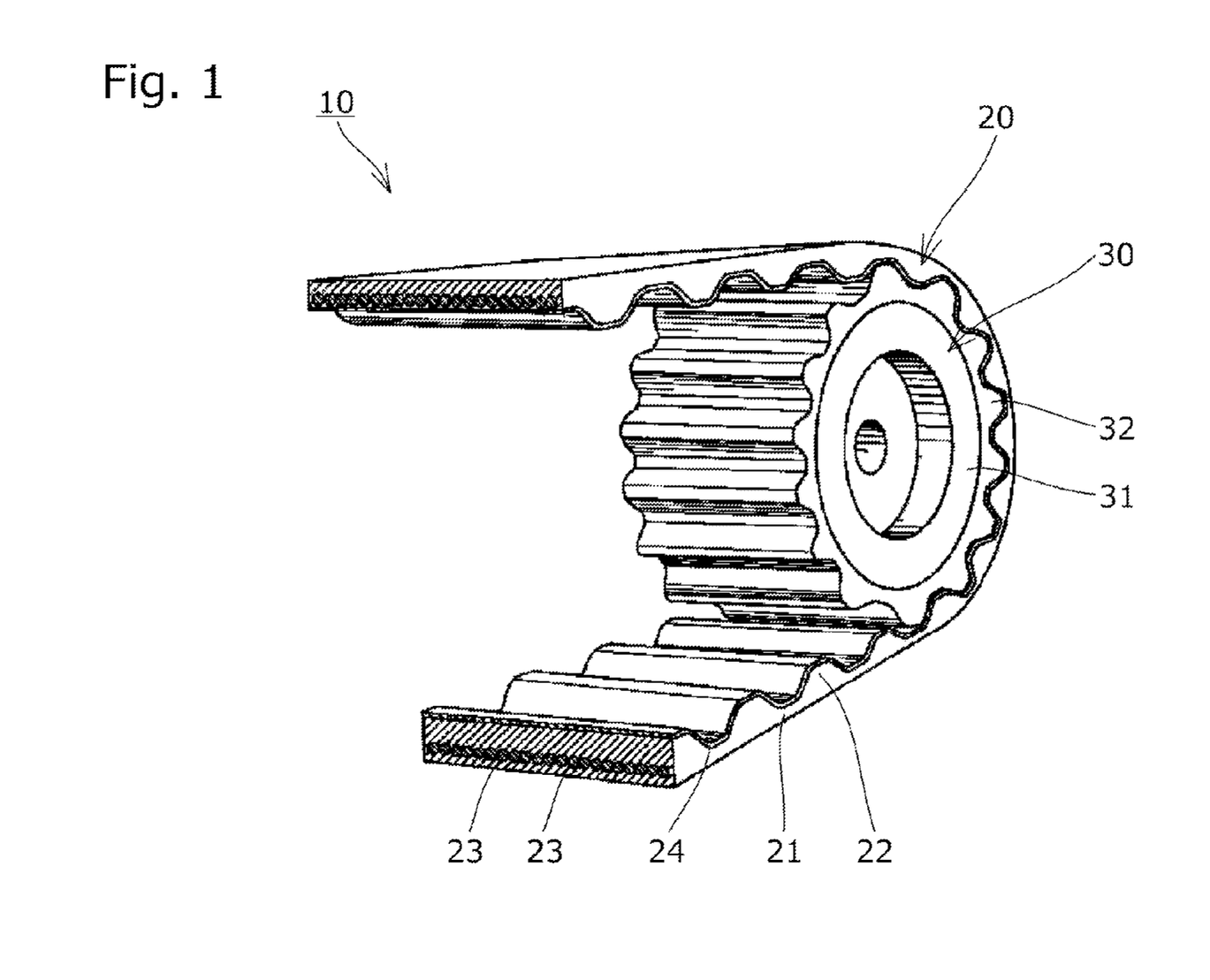
FIG. 1 is a perspective view showing a toothed belt transmission according to an embodiment of the present invention.

First, as shown in FIG. 1, the toothed belt transmission 10 is constituted of a toothed belt 20 having belt teeth 22 on its inner periphery side and a plurality of toothed pulleys 30 having pulley teeth 32 on their outer periphery sides and transmits rotation from a driving-side toothed pulley 30 to a driven-side toothed pulley 30 with the toothed belt 20 wound around the toothed pulleys 30.

As shown in FIG. 1, the toothed belt 20 has a belt body 21 and a plurality of belt teeth 22 formed on the inner peripheral surface of the belt body 21 at prescribed intervals in a belt longitudinal direction. The belt body 21 and the belt teeth 22 are made of an elastic material such as rubber.

Figure 2:
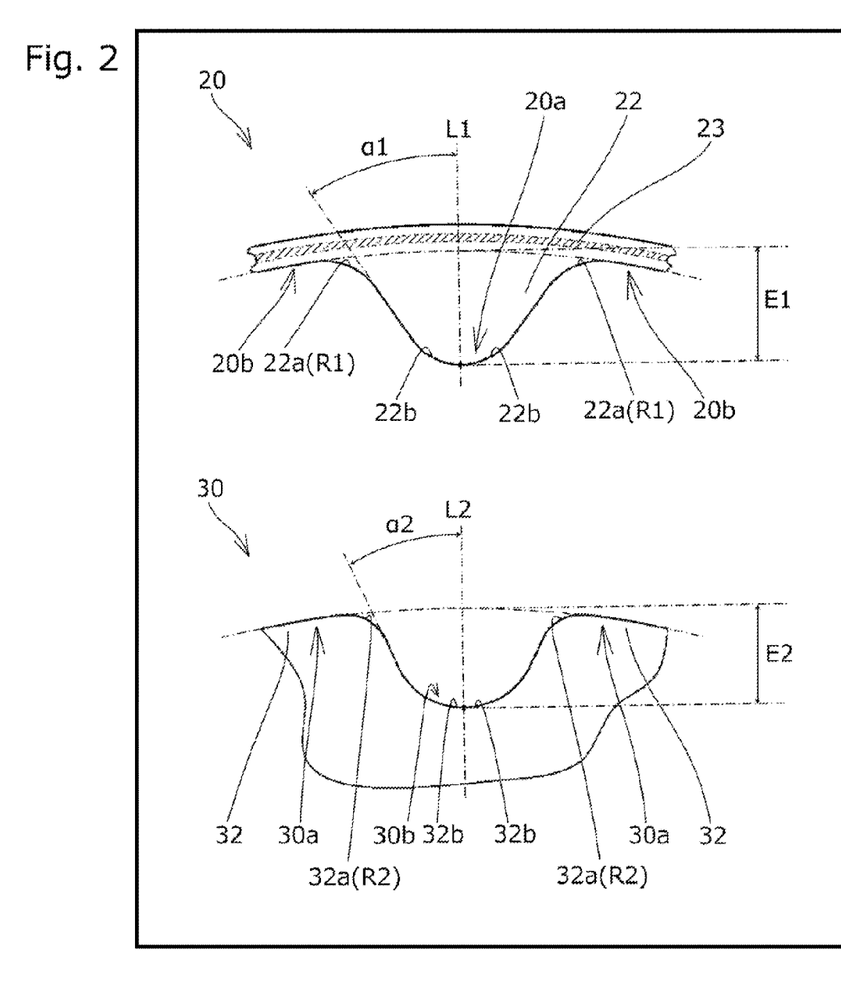
FIG. 2 is an explanatory view showing a toothed belt and a toothed pulley.

In addition, as shown in FIGS. 1 and 2, a core wire 23 made of glass fibers, aramid fibers, or the like is buried in the belt body 21. The core wire 23 extends along the belt longitudinal direction and is arranged on a side slightly inner than tooth bottom parts 20b of the toothed belt 20. Moreover, as shown in FIG. 1, a tooth cloth 24 is provided on the front surfaces of the belt teeth 22.

The toothed pulleys 30 are made of metal or the like. As shown in FIG. 1, each of the toothed pulleys 30 has a pulley body 31 and the plurality of pulley teeth 32 formed on the outer peripheral surface of the pulley body 31 at prescribed intervals in a pulley peripheral direction.

In the embodiment, the belt teeth 22 and the pulley teeth 32 are formed in a helical tooth shape cut diagonally with respect to a rotational axis. Note that in FIG. 1, the belt teeth 22 and the pulley teeth 32 are shown as being formed in a spur tooth shape cut parallel with respect to a rotational axis.

As shown in FIG. 2, the tooth surfaces of the respective belt teeth 22 have tooth root-side concave curved surfaces 22a continuous with the tooth bottom parts 20b of the toothed belt 20 and tooth tip-side convex curved parts 22b continuous with the apexes of tooth tip parts 20a of the toothed belt 20. In addition, the respective belt teeth 22 are formed symmetrically in the belt longitudinal direction. In other words, the belt teeth 22 are formed symmetrically across radius lines L1 of the belt teeth 22 (that pass through the apexes of the tooth tip parts 20a of the toothed belt 20).

As shown in FIG. 2, the tooth surfaces of the respective pulley teeth 32 have tooth tip-side convex curved parts 32a continuous with tooth tip parts 30a of the toothed pulleys 30 and tooth root-side concave curved parts 32b continuous with the apexes of tooth bottom parts 30b of the toothed pulleys 30. The tooth surfaces of the pulley teeth 32 facing each other across radius lines L2 of the pulley teeth 32 (that pass through the apexes of the tooth bottom parts 30b of the toothed pulleys 30) are formed symmetrically across the radius lines L2.

When the toothed belt 20 and the toothed pulleys 30 engage with each other, the tooth root-side concave curved parts 22a of the belt teeth 22 and the tooth tip-side convex curved parts 32a of the pulley teeth 32 face and contact each other, while the tooth tip-side convex curved parts 22b of the belt teeth 22 and the tooth root-side concave curved parts 32b of the pulley teeth 32 face and contact each other.

Note that the curved parts 22a, 22b, 32a, and 32b are formed, in an arc shape in the embodiment. However, the specific mode of the curved parts 22a, 22b, 32a, and 32b is not limited to the arc shape. For example, the curved parts 22a, 22b, 32a, and 32b may be formed of a curved line, a quadratic curve, a parabola, or the like close to an arc of which the curvature radius continuously changes.

In addition, the tooth root-side concave curved parts 22a and the tooth tip-side convex curved parts 22b of the belt teeth 22 may be linearly smoothly continuous with each other. Alternatively, other flat parts or curved parts may be interposed between the tooth root-side concave curved parts 22a and the tooth tip-side convex curved parts 22b.

Similarly, the tooth tip-side convex curved parts 32a and the tooth root-side concave curved parts 32b of the pulley teeth 32 may be linearly smoothly continuous with each other. Alternatively, other flat parts or curved parts may be interposed between the tooth tip-side convex curved parts 32a and the tooth root-side concave curved parts 32b.

Next, a description will be given of the design relationship between the toothed belt 20 and the toothed pulleys 30 featuring the toothed belt transmission 10 of the embodiment.

First, a tooth height E1 of the toothed belt 20 and a tooth height E2 of the toothed pulleys 30 are set so that the tooth tip parts 20a of the toothed belt 20 and the tooth bottom parts 30b of the toothed pulleys 30 contact each other before the tooth bottom parts 20b of the toothed belt 20 and the tooth tip parts 30a of the toothed pulleys 30 contact each other when the toothed belt 20 and the toothed pulleys 30 start engaging with each other. In the embodiment, as shown in FIG. 2, the tooth height E1 of the toothed belt 20 is set to be greater than the tooth height E2 of the toothed pulleys 30.

Figure 3:
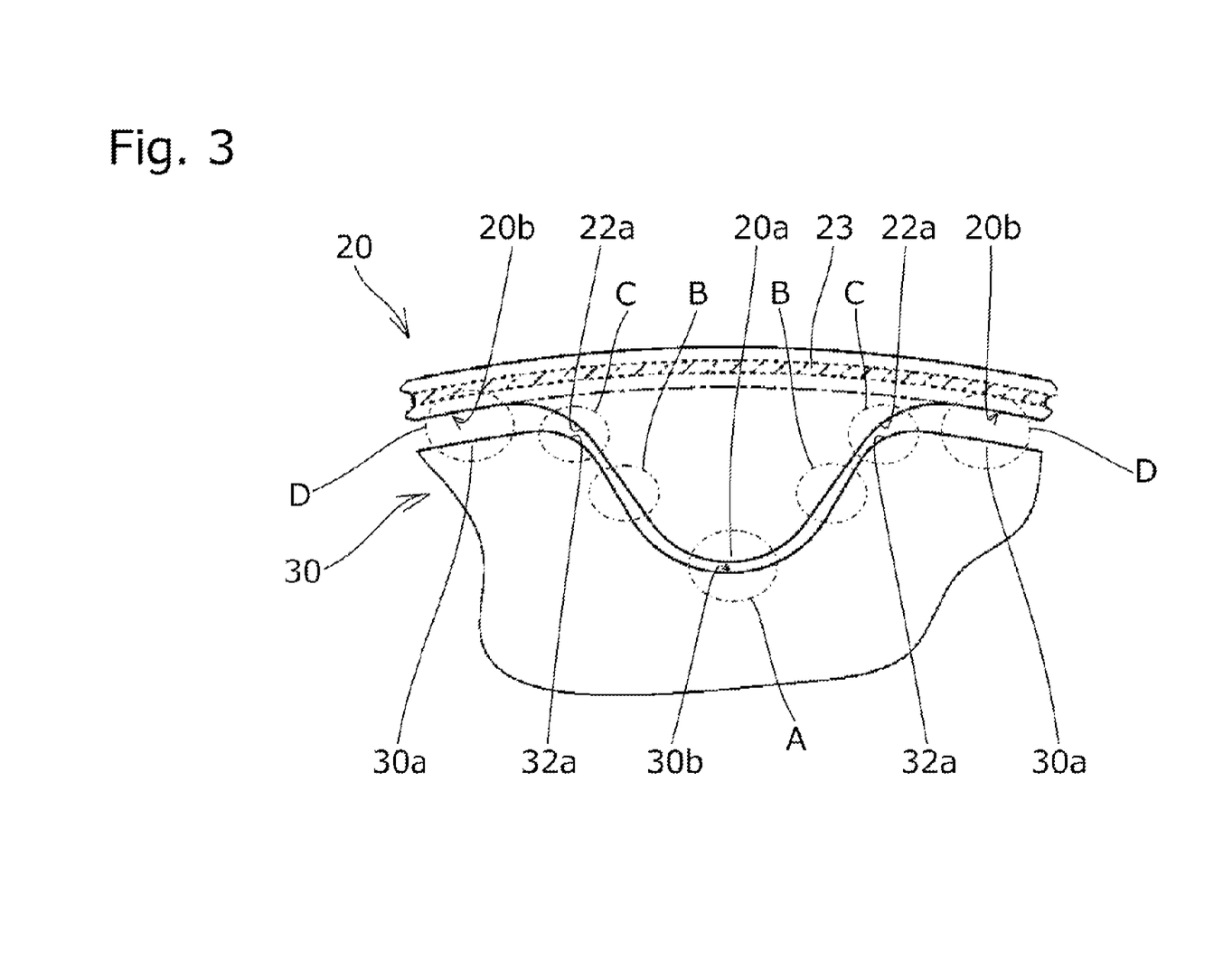
FIG. 3 is an explanatory view showing a state during the engagement between the toothed belt and the toothed pulley.
Figure 4:
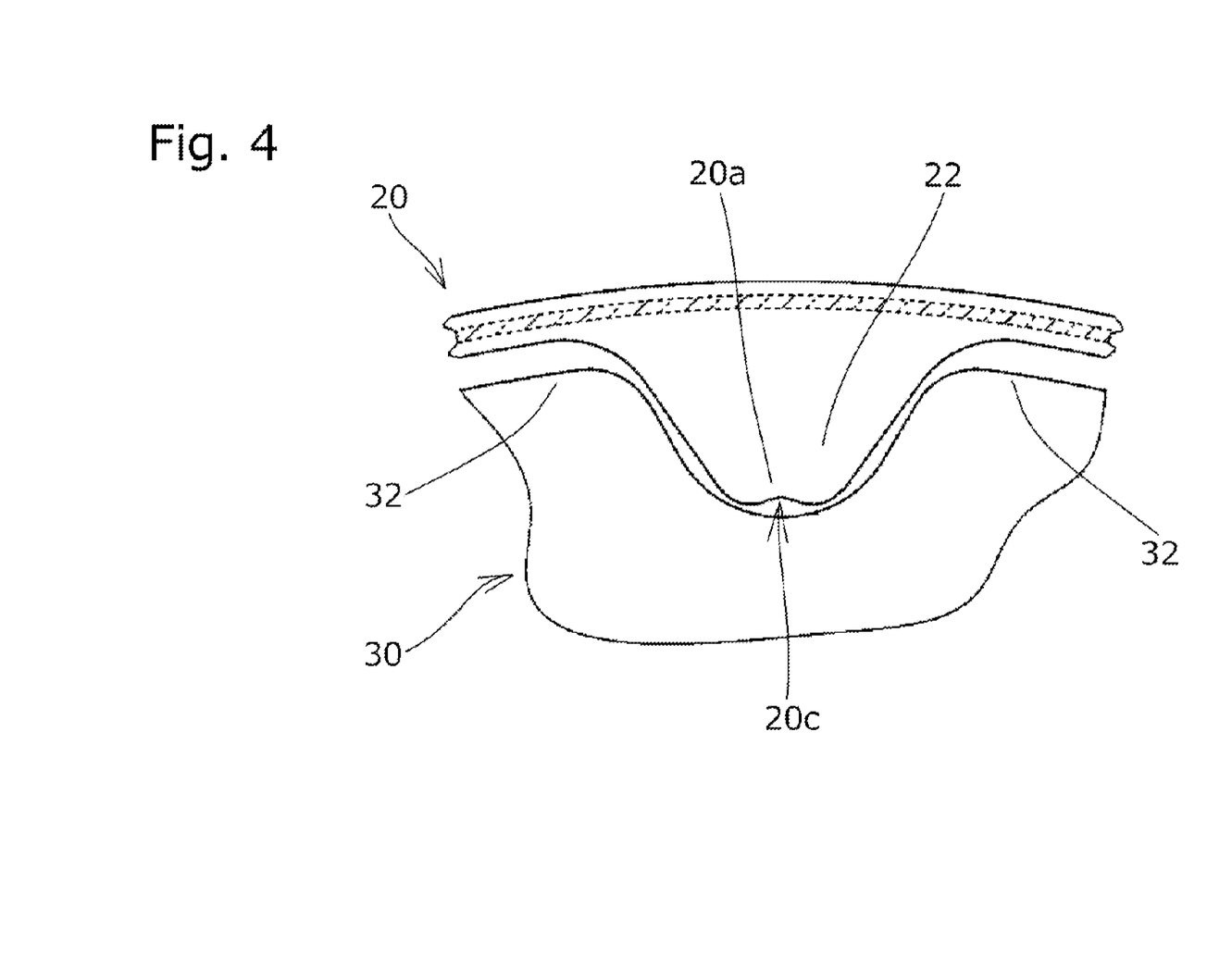
FIG. 4 is an explanatory view showing a first modified example of the toothed belt.
Figure 5:
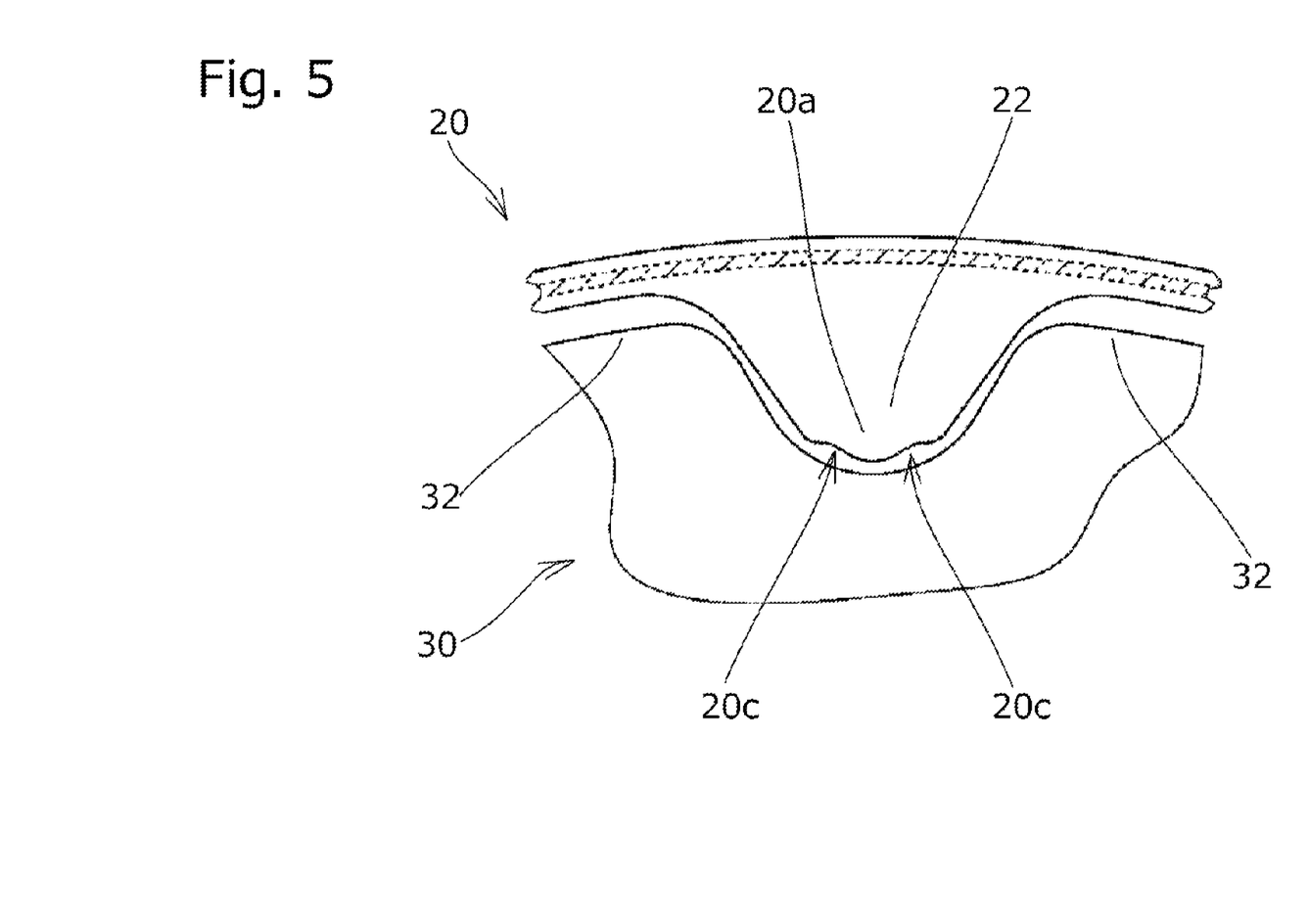
FIG. 5 is an explanatory view showing a second modified example of the toothed belt.
Figure 6:
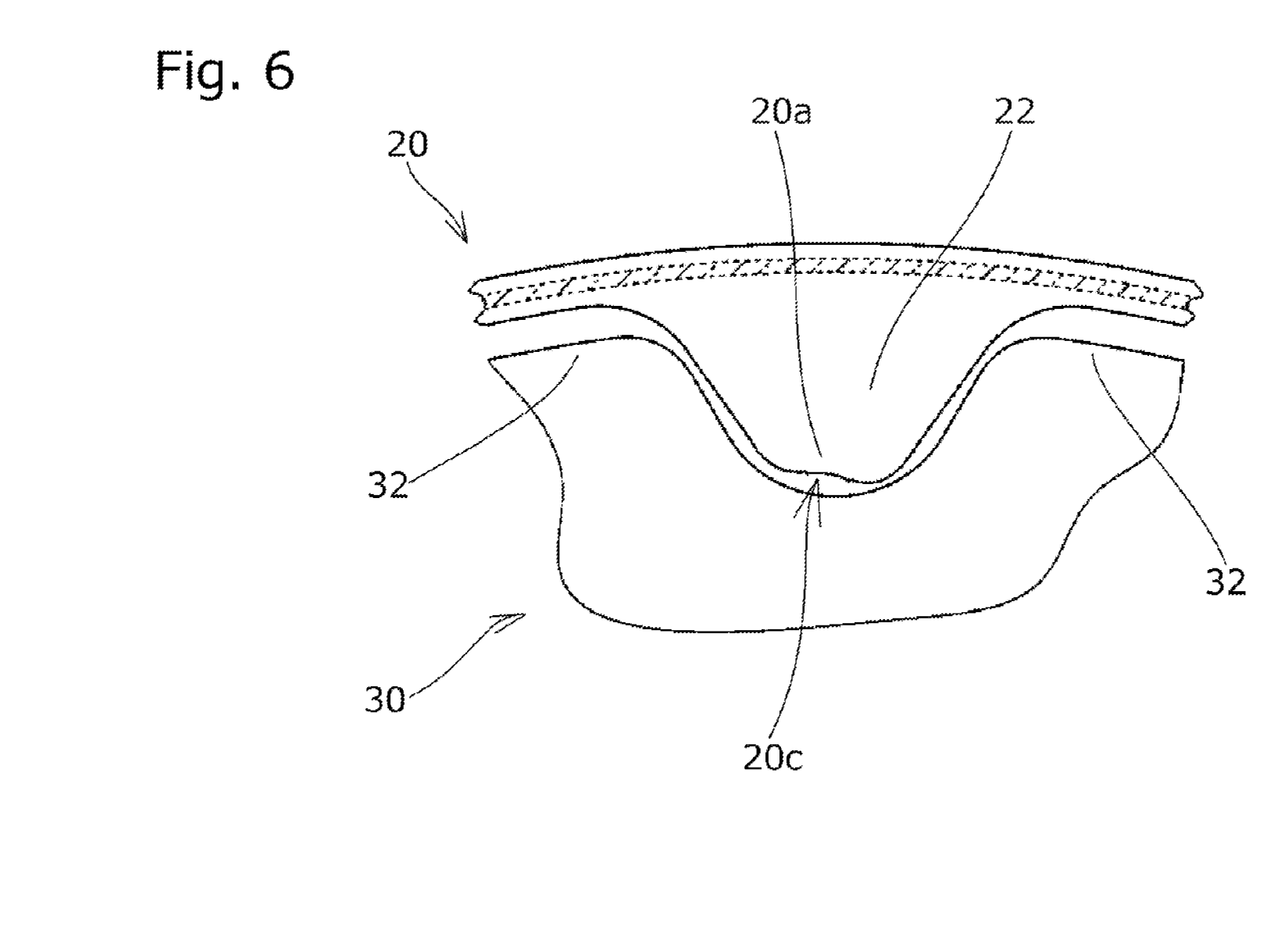
FIG. 6 is an explanatory view showing a third modified example of the toothed belt.
Figure 7:
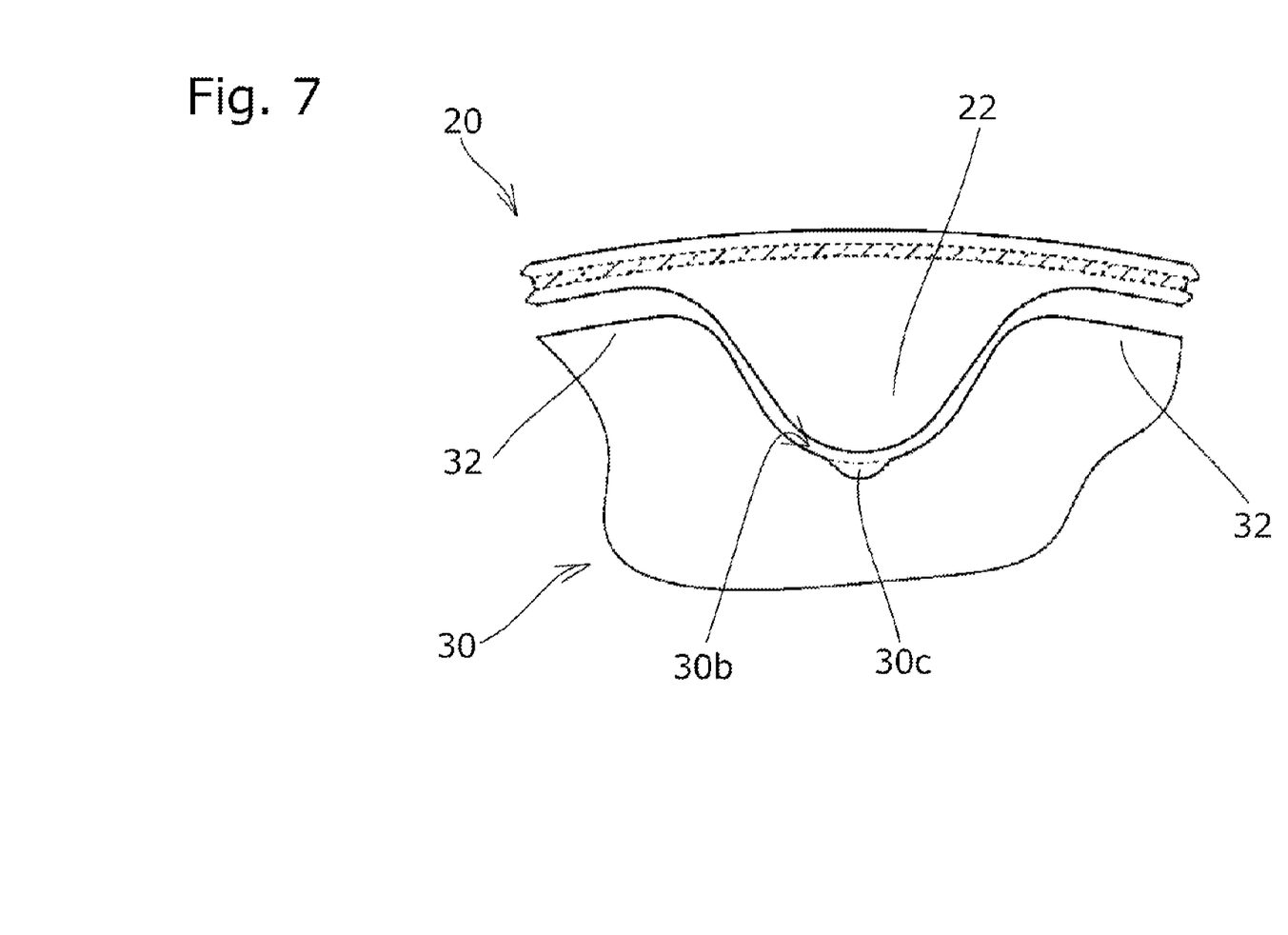
FIG. 7 is an explanatory view showing a modified example of the toothed pulley.

Thus, when the toothed belt 20 and the toothed pulleys 30 start engaging with each other, the tooth tip parts 20a of the toothed belt 20 and the tooth bottom parts 30b of the toothed pulleys 30 contact each other at A parts in FIG. 3 before the tooth bottom parts 20b of the toothed belt 20 and the tooth tip parts 30a of the toothed pulleys 30 contact each other at D parts in FIG. 3. As a result, after a shock caused when the toothed belt 20 and the toothed pulleys 30 engage with each other is absorbed at the A parts in FIG. 3 by the elastic deformation of the tooth tip parts 20a of the toothed belt 20 made of an elastic material such as rubber, the tooth bottom parts 20b of the toothed belt 20 and the tooth tip parts 30a of the toothed pulleys 30 may be caused to contact each other at the D parts in FIG. 3.

In addition, a curvature radius R1 of the tooth root-side concave curved parts 22a of the belt teeth 22 is set to be greater than or equal to a curvature radius R2 of the tooth tip-side convex curved parts 32a of the pulley teeth 32. Thus, during the engagement between the toothed belt 20 and the toothed pulleys 30, it is possible to cause the tooth root-side concave curved parts 22a of the respective belt teeth 22 and the tooth tip-side convex curved parts 32a of the respective pulley teeth 32 to reliably contact each other at C parts in FIG. 3. Therefore, the belt teeth 22 may be prevented from moving in a back and forth direction (belt longitudinal direction) with respect to the pulley teeth 32 on the tooth root-side of the belt teeth 22 in a state in which the belt teeth 22 and the pulley teeth 32 engage with each other.

Moreover, a pressure angle α1 of the tooth surfaces of the belt teeth 22 is set to be greater than a pressure angle α2 of the tooth surfaces of the pulley teeth 32. Therefore, as shown in B parts of FIG. 3, gaps may be reliably produced between the tooth surfaces of the belt teeth 22 and the pulley teeth 32 at the lateral parts of the belt teeth 22 and the pulley teeth 32 (between the tooth tip pars 20a and the tooth root-side concave curved parts 22a of the toothed belt 20 or between the tooth bottom parts 30b and the tooth tip-side convex curved parts 32a of the toothed pulleys 30).

Note that the "pressure angle α1 of the tooth surfaces of the belt teeth 22" represents an angle formed between the tangential lines of the tooth surfaces of the belt teeth 22 and the radius lines L1 of the toothed belt 20 (that pass through the apexes of the tooth tip parts 20a of the toothed belt 20) at reference parts (engagement parts).

Similarly, the "pressure angle α2 of the tooth surfaces of the pulley teeth 32" represents an angle formed between the tangential lines of the tooth surfaces of the pulley teeth 32 and the radius lines L2 of the toothed pulleys 30 (that pass through the apexes of the tooth bottom parts 30b of the toothed pulleys 30) at the reference parts (engagement parts).

Further, the tooth surfaces of the belt teeth 22 elastically deform so as to adapt themselves to the tooth surfaces of the pulley teeth 32 in a state in which the toothed belt 20 and the toothed pulleys 30 engage with each other. Therefore, the tooth bottom parts 20b of the toothed belt 20 and the tooth tip parts 30a of the toothed pulleys 30 contact each other at D parts in FIG. 3, and the tooth surfaces of the belt teeth 22 totally contact the tooth surfaces of the pulley teeth 32 in the end. As a result, power to be transmitted is sufficiently transmitted between the belt teeth 22 and the pulley teeth 32 without causing local stress concentration.

Furthermore, in the embodiment, the tooth tip parts 20a of the toothed belt 20 and the tooth bottom parts 30b of the toothed pulleys 30 are caused to contact each other at the A parts in FIG. 3 before the tooth root-side concave curved parts 22a of the belt teeth 22 and the tooth tip-side convex curved parts 32a of the pulley teeth 32 contact each other at the C parts in FIG. 3. Conversely, however, the tooth tip parts 20a of the toothed belt 20 and the tooth bottom parts 30b of the toothed pulleys 30 may be caused to contact each other at the A parts in FIG. 3 after the tooth root-side concave curved parts 22a of the belt teeth 22 and the tooth tip-side convex curved parts 32a of the pulley teeth 32 contact each other at the C parts in FIG. 3.

Furthermore, in the embodiment, the tooth bottom parts 20b of the toothed belt 20 and the tooth tip parts 30a of the toothed pulleys 30 are caused to contact each other at the D parts in FIG. 3 after the tooth root-side concave curved parts 22a of the belt teeth 22 and the tooth tip-side convex curved parts 32a of the pulley teeth 32 contact each other at the C parts in FIG. 3.

The embodiment of the present invention is described in detail above. However, the present invention is not limited to the above embodiment, and various design modifications may be carried out without departing from the scope of the present invention described in the claims.

The above embodiment describes an example in which the toothed belt transmission 10 is incorporated in an electric power steering device in use. However, the application of the toothed belt transmission 10 of the present invention is not limited to the example. For example, the toothed belt transmission 10 may be incorporated in a timing system for an automobile engine in use.

In addition, the above embodiment describes an example in which the belt teeth 22 and the pulley teeth 32 are formed in a helical tooth shape. However, the specific mode of the belt teeth 22 and the pulley teeth 32 is not limited to the example. For example, the belt, teeth 22 and the pulley teeth 32 may be formed in a spur tooth shape.

Moreover, as shown in FIG. 2, the above embodiment describes an example in which the tooth tip parts 20a of the toothed belt 20 are formed as convex curved parts. However, the tooth tip parts 20a of the toothed belt 20 may be formed in any shape. For example, the tooth tip parts 20a of the toothed belt 20 may be formed in a flat surface shape.

Further, as shown in FIGS. 4 to 7, the tooth tip parts 20a of the toothed belt 20 and the tooth bottom parts 30b of the toothed pulleys 30 may have one or a plurality of concave parts 20c and 30c. In this case, when the tooth tip parts 20a of the toothed belt 20 and the tooth bottom parts 30b of the toothed pulleys 30 contact each other, it is possible to release compressed air between the tooth tip parts 20a of the toothed belt 20 and the tooth bottom parts 30b of the toothed pulleys 30 in a tooth trace direction without being trapped to avoid a cause of noise and release the elastic material of the elastically-deforming belt teeth 22 into the above gaps. Therefore, colliding energy may be relaxed.

What is claimed is:

1. A toothed belt transmission transmitting rotation, comprising:
   a toothed belt having belt teeth, and
   a toothed pulley having pulley teeth being engaged with each other,
   wherein a tooth height of the toothed belt and a tooth height of the toothed pulley being set so that when the toothed belt and the toothed pulley start engaging with each other, tooth tip parts of the toothed belt and tooth bottom parts of the toothed pulley contact each other before tooth bottom parts of the toothed belt and tooth tip parts of the toothed pulley contact each other, wherein tooth surfaces of the belt teeth have tooth root-side concave curved parts continuous with the tooth bottom parts of the toothed belt, respectively, wherein tooth surfaces of the pulley teeth have tooth tip-side convex curved parts continuous with tooth tip parts of the toothed pulley, respectively, and wherein the toothed belt and the toothed pulley are set so that when the toothed belt and the toothed pulley start engaging with each other, the tooth tip parts of the toothed belt and the tooth bottom parts of the toothed pulley contact each other, and then, the tooth root-side concave curved parts of the toothed belt and the tooth tip-side convex curved parts of the toothed pulley contact each other, and further then, the tooth bottom parts of the toothed belt and the tooth tip parts of the toothed pulley contact each other, and lateral parts of the tooth surfaces of the toothed belt and lateral parts of the tooth surfaces of the toothed pulley contact each other, in region between a contact point where the tooth tip parts of the toothed belt and the tooth bottom parts of the toothed pulley contact each other and a contact point where the tooth root-side concave curved parts of the toothed belt and the tooth tip-side convex curved parts of the toothed pulley contact each other.

2. The toothed belt transmission according to claim 1, wherein the tooth height of the toothed belt is set to be greater than the tooth height of the toothed pulley.

3. The toothed belt transmission according to claim 1, wherein a curvature radius of the tooth root-side concave curved parts of the belt teeth is set to be greater than or equal to a curvature radius of the tooth tip-side convex curved parts of the pulley teeth.

4. The toothed belt transmission according to claim 1, wherein a pressure angle of tooth surfaces of the belt teeth is set to be greater than a pressure angle of tooth surfaces of the pulley teeth.

\* \* \* \* \*